United States Patent
Sharma

(10) Patent No.: US 12,330,950 B2
(45) Date of Patent: Jun. 17, 2025

(54) METHODS FOR PRODUCING HOLLOW SILICA PARTICLES

(71) Applicant: UT-Battelle, LLC, Oak Ridge, TN (US)

(72) Inventor: Jaswinder K. Sharma, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 784 days.

(21) Appl. No.: 17/621,517

(22) PCT Filed: Jun. 23, 2020

(86) PCT No.: PCT/US2020/039128
§ 371 (c)(1),
(2) Date: Dec. 21, 2021

(87) PCT Pub. No.: WO2020/263820
PCT Pub. Date: Dec. 30, 2020

(65) Prior Publication Data
US 2022/0363552 A1     Nov. 17, 2022

Related U.S. Application Data

(60) Provisional application No. 62/982,963, filed on Feb. 28, 2020, provisional application No. 62/865,352, filed on Jun. 24, 2019.

(51) Int. Cl.
*C01B 33/18*     (2006.01)

(52) U.S. Cl.
CPC .......... *C01B 33/18* (2013.01); *C01P 2004/34* (2013.01); *C01P 2004/61* (2013.01); *C01P 2004/62* (2013.01); *C01P 2004/64* (2013.01)

(58) Field of Classification Search
CPC .. C01B 33/18; C01P 2004/34; C01P 2004/61; C01P 2004/62; C01P 2004/64
See application file for complete search history.

(56) References Cited

U.S. PATENT DOCUMENTS

| | | | |
|---|---|---|---|
| 2004/0082463 A1 | 4/2004 | Bergbreiter et al. | |
| 2011/0135571 A1* | 6/2011 | Lin | A61P 35/00 424/490 |

(Continued)

FOREIGN PATENT DOCUMENTS

| | | | |
|---|---|---|---|
| CN | 104258828 A | * | 1/2015 |
| WO | 2015031580 A1 | | 3/2015 |

(Continued)

OTHER PUBLICATIONS

Park, In, et al. "Monodisperse Polystyrene-Silica Core-Shell Particles and Silica Hollow Spheres Prepared by the Stöber Method." Journal of nanoscience and nanotechnology 9.12 (2009): 7224-7228.*

(Continued)

*Primary Examiner* — Richard M Rump
(74) *Attorney, Agent, or Firm* — Scully, Scott, Murphy & Presser, P.C.

(57) ABSTRACT

A method for producing hollow silica particles, comprising: (i) producing a first batch of core-shell particles in which each core-shell particle contains a sacrificial core coated with a silica shell, by adding a tetrahydrocarbyl orthosilicate and hydroxide base to a suspension of sacrificial core particles in a solvent-water mixture, wherein the resulting suspension has a pH of at least 10, and wherein the foregoing steps result in a coating of silica on the sacrificial core particles to produce the first batch of core-shell particles; (ii) separating the first batch of core-shell particles from the solvent-water mixture; (iii) producing a second batch of core-shell particles in the first-stage recovered solvent- (Continued)

water; (iv) separating the second batch of core-shell particles from the first-stage recovered solvent-water mixture; and (v) subjecting the dry first and second batches of core-shell particles to a core removal process to produce the hollow silica particles.

17 Claims, 5 Drawing Sheets

(56) References Cited

U.S. PATENT DOCUMENTS

| | | |
|---|---|---|
| 2014/0341958 A1 | 11/2014 | Gosselin et al. |
| 2017/0073237 A1 | 3/2017 | Lim et al. |
| 2018/0065859 A1 | 3/2018 | Kummel et al. |

FOREIGN PATENT DOCUMENTS

| | | |
|---|---|---|
| WO | 2015138144 A1 | 9/2015 |
| WO | 2019088922 A1 | 5/2019 |

OTHER PUBLICATIONS

Ernawati, L., et al., "Hollow Silica as an Optically Transparent and Thermally Insulating Polymer Additive", Langmuir 2016, Received: Nov. 5, 2015, Revised: Dec. 9, 2015, Published: Dec. 10, 2015 pp. 338-345, 32.

Gao, T., et al., "Monodisperse Hollow Silica Nanospheres for Nano Insulation Materials: Synthesis, Characterization, and Life Cycle Assessment", ACS Appl. Mater. Interfaces 2013, Received: Oct. 12, 2012, Accepted: Jan. 18, 2013, Published: Jan. 18, 2013, pp. 761-767, 5.

Gao, T., et al., "Nano Insulation Materials: Synthesis and Life Cycle Assessment", Procedia CIRP 15 (2014), pp. 490-495.

International Search Report and Written Opinion dated Oct. 8, 2020 issued in PCT/US 20/39128, 11 pages.

Liao, Y., et al., "Composite thin film of silica hollow spheres and waterborne polyurethane: Excellent thermal insulation and light transmission performances", Materials Chemistry and Physics (2012), Received Sep. 226, 011, Received in revised form Jan. 11, 2012, Accepted Jan. 17, 2012, pp. 642-648, 133.

Ruckdeschel, P., et al., "Hollow Silica Sphere Colloidal Crystals: Insights into Calcination Dependent Thermal Transport", Nanoscale, 2015, Received Jan. 20, 2015, Accepted Apr. 27, 2015, pp. 10059-10070, 7.

Thapliyal, P.C. et al., "Aerogels as Promising Thermal Insulating Materials: An Overview", Journal of Materials, Received Jan. 11, 2014, Accepted Feb. 11, 2014, Published Apr. 27, 2014, 10 pages, vol. 2014, Article ID 127049.

\* cited by examiner 2B                    2C

METHODS FOR PRODUCING HOLLOW SILICA PARTICLES

CROSS REFERENCE TO RELATED APPLICATION

The present application is a '371 of International PCT/US2020/039128 filed on Jun. 23, 2020 and claims benefit of U.S. Provisional Application No. 62/865,352, filed on Jun. 24, 2019, and 62/982,963, filed on Feb. 28, 2020, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention generally relates to methods for producing hollow silica particles, and more particularly, chemical-based methods in which sacrificial cores are coated with a silica shell followed by removal of the sacrificial cores.

BACKGROUND OF THE INVENTION

Hollow silica particles in the size range of 10 nm to 10 μm have attracted scientists in diverse fields in view of their unique properties, such as low density, low thermal conductivity, and large available volume. Their main applications are in the fields of thermal insulation, lightweight materials, drug delivery, and superhydrophobic materials. In thermal insulation applications, hollow silica particles can be used alone or in combination with other materials. When used in combination with other materials, hollow silica particles make other materials better thermal insulators. It is the trapped air inside the cavities that gives hollow particles their low thermal conductivity, and it is mainly because of the cavities that these particles lower the thermal conductivity of any material in which they are mixed.

Hollow silica particles are conventionally synthesized by employing preformed polystyrene (PS) particles as a template, followed by deposition of silica on these polystyrene particles (typically, by addition and hydrolysis-condensation of TEOS), followed by removal of polystyrene by burning at high temperature (e.g., L. Ernawati et al., *Langmuir*, 32(1), 338-345, 2016). The use of PS particles as templates is gaining attention because these particles can be synthesized at low cost and with tunable size. PS particle-based synthesis of hollow silica particles generally involves three steps: (1) synthesizing PS particles, (2) depositing silica shells on PS particles, and (3) removing the PS cores by burning or dissolving them to obtain hollow silica particles. However, a significant drawback of this technique is that the product yield is very low, which results in high cost of the hollow silica particles. The low product yield generally corresponds to a product to reaction volume ratio of ca. 0.5-1.0% weight/volume (w/v), which makes the overall process expensive. For example, 100 mL of ethanol or isopropanol is generally used to make no more than 3.0 cm$^3$ of hollow silica particles. A significant contributing factor in the low yield and high cost of hollow silica particles is the inefficient use and wastage of solvents. However, a method to reduce solvent usage while increasing yield of the hollow silica particles has remained elusive. There have been some efforts to reduce solvent usage and increase yield of hollow silica particles by simply increasing the concentration of PS particles and TEOS; however, such efforts have been largely unsuccessful.

SUMMARY OF THE INVENTION

In a first aspect, the present disclosure is directed to a method for producing hollow silica particles in which the solvent is recycled, and thus, used with much greater efficiency than conventionally used in the art. The method achieves the recycling of the solvent while adjusting the process at each recycle stage to maintain the conditions necessary for continued production of hollow silica particles at each recycle stage. As further discussed below, it has herein been found that a particularly crucial condition to be maintained at each recycle stage is a pH of at least 10, 10.5, 11, 11.5, or 12.0. By maintaining this high pH during the silica deposition reaction, recycled solvent (i.e., solvent-water mixture) can advantageously be re-used any number of times to produce additional HSPs. This recycling of solvent can dramatically reduce the amount of solvent used. For example, for the same recycled 100 mL volume of solvent, an overall (total) yield of at least 50, 75, or 100 cm$^3$ per 100 mL solvent is now possible.

The recycling method more specifically employs the following steps: (i) producing a first batch of core-shell particles in which each core-shell particle contains a sacrificial core coated with a silica shell, by adding a tetrahydrocarbyl orthosilicate (THOS) and hydroxide base to a suspension of sacrificial core particles in a solvent-water mixture wherein the solvent is an organic solvent miscible with water, wherein the resulting suspension has a pH of at least 10 after the THOS and hydroxide base are present in the suspension, wherein the sacrificial core particles have an organic-based composition, and wherein the foregoing steps result in a coating of silica on the sacrificial core particles to produce the first batch of core-shell particles; (ii) separating the first batch of core-shell particles from the solvent-water mixture to result in a dry first batch of core-shell particles and first-stage recovered solvent-water mixture corresponding to the separated solvent-water mixture; (iii) producing a second batch of core-shell particles in the first-stage recovered solvent-water mixture by adding sacrificial core particles, THOS, and hydroxide base sufficient to adjust the pH of the first-stage recovered solvent-water mixture to at least 10, wherein step (iii) results in a coating of silica on the sacrificial core particles to produce the second batch of core-shell particles; (iv) separating the second batch of core-shell particles from the first-stage recovered solvent-water mixture used in step (iii) to result in a dry second batch of core-shell particles and second-stage recovered solvent-water mixture; and (v) subjecting the dry first and second batches of core-shell particles to a core removal process to result in removal of the sacrificial cores, to produce the hollow silica particles.

In a second aspect, the present disclosure is directed to a method for producing hollow silica particles in which the yield of hollow silica particles is substantially increased, e.g., at least or more than 10, 20, or 30 cm$^3$ per 100 mL of solvent (i.e., solvent-water mixture), even without recycling. Notably, the foregoing method can be used in the presence or absence of recycling of the solvent. The method achieves this increase in yield by employing an amount (concentration) of sacrificial core particles than conventionally used in the art, e.g., at least or more than 2, 3, 4, or 5 wt % while maintaining a pH of at least 10, 10.5, 11, 11.5, or 12 after the THOS and hydroxide base are added to the suspension of sacrificial core particles. In one embodiment, all of the THOS used for the entire reaction is added in one step to the suspension of sacrificial core particles. In another embodiment, the THOS used for the entire reaction is added in parts (i.e., in aliquots) to the suspension of sacrificial core particles separated by a suitable time period between additions (e.g., 4-10 hours). In either case, the pH of at least 10, 10.5, 11, 11.5, or 12 should be maintained.

The high yield method more specifically employs the following steps: (i) producing a batch of core-shell particles in which each core-shell particle contains a sacrificial core coated with a silica shell, by adding a tetrahydrocarbyl orthosilicate (THOS) and hydroxide base to a suspension of sacrificial core particles in a solvent-water mixture wherein the solvent is an organic solvent miscible with water, wherein the sacrificial core particles are present in the solvent-water mixture in a concentration of at least 2 wt %; wherein the resulting suspension has a pH of at least 10 after the THOS and hydroxide base are present in the suspension; wherein the sacrificial core particles have an organic-based composition; and wherein the foregoing steps result in a coating of silica on the sacrificial core particles to produce the batch of core-shell particles; (ii) separating the batch of core-shell particles from the solvent-water mixture to result in a dry batch of core-shell particles and separated solvent-water mixture; and (iii) subjecting the dry batch of core-shell particles to a core removal process to result in removal of the sacrificial cores, to produce at least 10 cm$^3$ of the hollow silica particles per 100 mL of solvent (solvent-water mixture).

BRIEF DESCRIPTION OF THE DRAWINGS

FIG. 2A is a schematic showing the stepwise addition of TEOS at an optimum concentration to form silica shells around the PS particles at a high concentration. Note: the schematic shows only the core-shell particle formation; the step of removing the PS cores to obtain hollow silica particles is not shown. FIG. 2B is a picture of the hollow silica particles synthesized from 100 mL of isopropanol. FIG. 2C is a SEM image of the same hollow silica particles.

FIG. 3A (left side) is a schematic depiction of shell formation when pH is below 9.5; FIG. (right side) is a TEM image showing bare PS particles and free silica particles formed in the process. FIG. 3B (left side) is a schematic depiction of shell formation when pH is about 11; FIG. 3B (right side) is a SEM image showing nicely formed PS core-silica shell particles without any free silica particle formation. Note: the schematics show only core-shell particle formation. The step of burning the PS cores to obtain hollow silica particles is not shown.

FIG. 4A is a schematic showing the steps involved in the method for producing HSPs along with recycling of solvent. FIGS. 4B, 4C, and 4D are SEM images of the particles synthesized by the original reaction mixture (FIG. 4B), the first reiteration (FIG. 4C), and the second reiteration (FIG. 4D). Note: the process was repeated only three times, but the retrieved solution can be used for several more iterations as long as the pH is maintained.

DETAILED DESCRIPTION OF THE INVENTION

Figure 1:
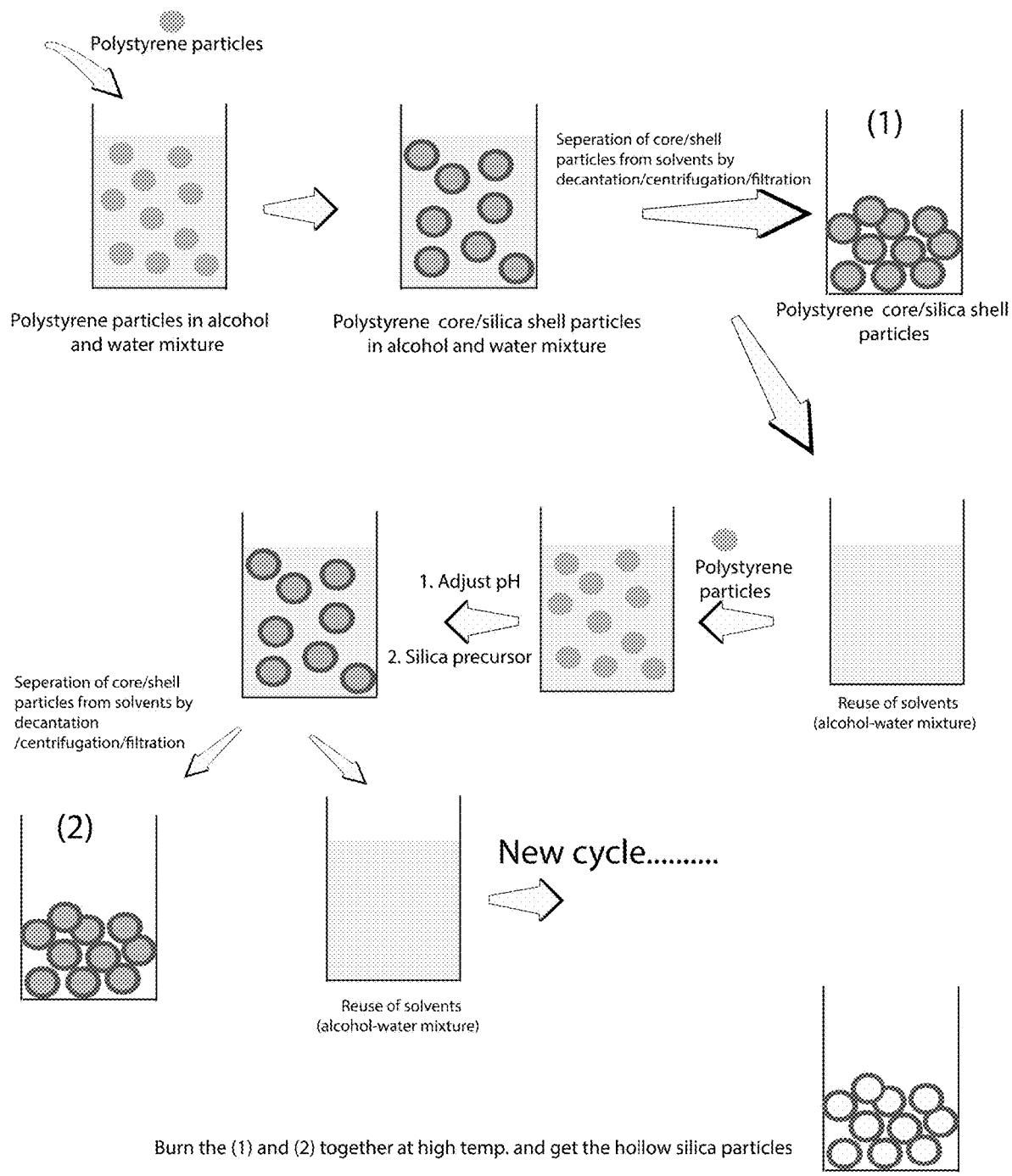
FIG. 1. Schematic diagram showing the recycling of solvent in a process of producing hollow silica particles (HSPs).

The term "hollow silica particles," also herein referred to as HSPs, are silica particles containing a hollow inner space encapsulated by a silica shell. The hollow inner space is generally occupied by a gas, such as air or other gas (e.g., nitrogen, argon, or krypton), or gases resulting from combustion of the sacrificial core. The HSPs may also, in some embodiments, encapsulate a space under reduced pressure (i.e., less than 1 atm) or under partial vacuum (e.g., 0.1 atm or less) depending on the conditions used during or after removal of the sacrificial core. The HSPs are typically spherical. The term "spherical," as used herein, is meant to encompass any shape that is precisely or substantially spherical or approaching a spherical shape, including elliptical (i.e., oval) shapes, except that the elliptical shape generally has a degree of eccentricity of no more than 0.5, 0.4, 0.3, 0.2, or 0.1. The HSPs typically have a silica shell thickness of at least 1 nm and up to 200 nm. In different embodiments, the silica shell has a thickness of about, precisely, at least, or up to, for example, 1, 2, 5, 8, 10, 15, 20, 25, 30, 50, 75, 100, 125, 150, 175, or 200 nm, or a thickness within a range bounded by any two of the foregoing values.

The HSPs generally have a mean (average) particle size approximately equivalent to the size of the sacrificial core particles on which silica is deposited, typically at least 10 nm and up to 1, 2, 3, 4, or 5 µm (microns). Depending on the size of the sacrificial core particles, the HSPs (and by default, the corresponding sacrificial core particles) can have a particle size of about, precisely, at least, above, up to, or less than, for example, 10 nm, 20 nm, 30 nm, 40 nm, 50 nm, 100 nm, 150 nm, 200 nm, 300 nm, 400 nm, 500 nm, 1 µm, 2 µm, 3 µm, 4 µm, 5 µm, or 10 µm, or a particle size within a range bounded by any two of the foregoing values. The particle size generally refers to the diameter of the particle, wherein the diameter generally refers to the length through the midpoint of the particle. As the foregoing definition of the particle size includes the wall thickness, the diameter of the inner hollow portion (inner diameter) is necessarily smaller than the particle size or diameter as defined above. If not a perfect sphere, the term "diameter" generally refers to an average diameter of the short and long dimensions of the particle. In some embodiments, any one or more of the foregoing particle sizes may be excluded.

In some embodiments, the HSPs are moderately or substantially polydisperse in size, e.g., by employing a mixture of core particles with different diameters. In other embodiments, the HSPs have a substantial degree of uniformity in size. The substantial degree of uniformity in the HSPs may, in some embodiments, be a result of a substantial degree of uniformity in the sacrificial core particles. The substantial degree of uniformity may be particularly advantageous for rendering a thermally insulating composition substantially or completely transparent. The degree of uniformity can be expressed as a constraint on the distribution of particle sizes relative to the average particle size. For example, in some embodiments, at least 90%, 95%, 98%, 99%, or 100% (all) of the hollow silica particles have particle sizes that are within ±20% of the mean particle size. Conversely, up to or less than 10%, 5%, 2%, 1%, or 0% of the particles may have particle sizes that are beyond ±20% of the mean particle size. As an example, a population of hollow silica particles having an average particle size of 200 nm may have a particle size distribution in which at least 90% of the particles have a size within a size range of 160-240 nm, which is within ±20% of the average particle size of 200 nm. Conversely, 10% or less (e.g., 5%, 2%, 1%, or 0%) of the particles may be permitted to have a size less than 160 nm and/or greater than 240 nm in the foregoing example.

The hollow silica particles may be porous or non-porous. Typically, as a result of the synthetic procedure, the hollow particles possess some level of porosity. For purposes of the invention, in the event the hollow particles are porous, the pores typically have a size of no more than (i.e., up to or less than) 50 nm. The pores preferably have a size less than 50 nm, such as a size of up to or less than 40, 30, 20, 10, 5, 2, or 1 nm. In some embodiments, the pores are exclusively micropores, i.e., pore size up to or less than 2 nm or 1 nm. Nevertheless, other applications for the hollow silica particles may prefer a larger pore size, such as a pore size greater than 50 nm, such as at least 75 nm, 100 nm, 150 nm, or 200 m. In some embodiments, any one or more of the foregoing pore sizes may be excluded.

The sacrificial core particles (on which a silica shell is coated) can have any organic-based composition. The organic-based composition is typically an organic polymer composition. The organic polymer composition may more specifically be, for example, a polystyrene, polyolefin (e.g., polyethylene or polypropylene), latex, polyester (e.g., PET, PLA, PGA, or PCL), polyvinyl addition polymer (e.g., PAA, PMA, PMMA, polyacrylamide or polyvinyl alcohol), or polyresorcinol composition. Numerous organic-based particles are well known in the art, with many being commercially available. Any such organic-based particles may be suited as sacrificial core particles for purposes of the present invention provided they are stable and non-reactive under the conditions used herein for coating the sacrificial cores with silica. Methods for synthesizing a diverse range of organic-based particles are also well known in the art.

In the method, a tetrahydrocarbyl orthosilicate (THOS) is included in the solvent-water mixture in the presence of the sacrificial core particles and hydroxide base to coat the sacrificial core particles with a silica shell. The hydroxide base can be any such base known in the art that is substantially or fully soluble in water, e.g., ammonium hydroxide (AH), tetramethylammonium hydroxide (TMAH), sodium hydroxide, potassium hydroxide, or lithium hydroxide. The THOS compound can be any compound having the following general structure:

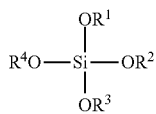

wherein $R^1$, $R^2$, $R^3$, and $R^4$ are independently hydrocarbyl (hydrocarbon) groups, typically containing at least one and up to six carbon atoms, and wherein $R^1$, $R^2$, $R^3$, and $R^4$ may be the same or different. Some examples of hydrocarbon groups include methyl, ethyl, n-propyl, isopropyl, n-butyl, isobutyl, sec-butyl, n-pentyl, n-hexyl, phenyl, and benzyl groups. Notably, the THOS compound should be completely soluble in the solvent-water mixture. Some examples of THOS compounds include tetramethyl orthosilicate (TMOS), tetraethyl orthosilicate (TEOS), tetrapropyl orthosilicate (TPOS), and tetraphenyl orthosilicate. Although a single THOS compound is typically used in a reaction, the present disclosure considers the use of a combination of two, three, or more THOS compounds.

The methods described herein for producing HSPs employ a solvent-water mixture in which the reactants (e.g., sacrificial core particles, THOS, and hydroxide base) are contained. The THOS and hydroxide base should be fully soluble in the solvent-water mixture. The term "solvent," as used herein, generally refers to a compound having a melting point of no more than about 25° C., i.e., liquid at typical room temperature conditions. For purposes of the invention, the solvent is any organic solvent completely miscible with water, and thus, the solvent-water mixture is a single phase system. Some examples of such solvents include certain alcohols (e.g., methanol, ethanol, and isopropanol), diols (e.g., ethylene glycol or propylene glycol), ketones (e.g., acetone or methyl ethyl ketone), ethers (e.g., THF or dioxane), nitriles (e.g., acetonitrile or propionitrile), DMF, and DMSO. In the solvent-water mixture, the water is typically present in an amount of no more than (up to) or less than 5, 10, 20, 30, 40, 50, or 60 vol % (or wt %), or conversely, the solvent is typically present in an amount of at least or above 40, 50, 60, 70, 90, or 95 vol % (or wt %). Alternatively, the solvent to water (solvent:water) ratio is typically at least or more than 0.4:1 vol % (or wt %), and more typically, at least or more than 0.5:1, 0.6:1, 0.7:1, 0.8:1, 0.9:1, 1:1, 1.1:1, 1.2:1, 1.3:1, 1.4:1, 1.5:1, 2:1, 2.5:1, 3:1, 3.5:1, 4:1, 4.5:1, 5:1, 8:1, or 10:1 vol % (or wt %). In some embodiments, the solvent is present in a substantially predominant amount, such as an amount of 95, 98, or 99 vol % (or wt %). For purposes of the invention, the solvent-water mixture should contain at least a trace of water, which may be, for example, 1, 0.5, 0.2, or 0.1 vol % (or wt %) of water. Thus, the solvent may be present in an amount above 99.0 vol % but below an absolute value of 100 vol % (or wt %), such as up to 99.9 vol %.

In the methods described herein for producing the HSPs, core-shell particles are first produced in which each core-shell particle contains a sacrificial core coated with a silica shell, wherein, as further discussed below, the sacrificial cores are derived from sacrificial core particles described above. The foregoing step is also herein referred to as step (i). In step (i), the core-shell particles are produced by adding tetrahydrocarbyl orthosilicate (THOS) and hydroxide base to a suspension of sacrificial core particles in a solvent-water mixture. Notably, the hydroxide base is added in sufficient amount to make the pH of the resulting suspension (i.e., containing sacrificial core particles, THOS, and hydroxide base) at least 10, or more typically, at least 10.5, 11, 11.5, or 12, or a pH within a range bounded by any two of the foregoing values.

The sacrificial core particles can be included in the solvent-water mixture in any desired concentration provided that a proportionate amount of THOS is added to the suspension to coat each sacrificial core particle with a coating of silica. In some embodiments, the sacrificial core particles may be included in a conventional concentration of, for example, 50 mg, 100 mg, 500 mg, or 1 g per 100 mL of the solvent-water mixture. In other embodiments, the sacrificial core particles may be included in a substantially greater than conventional concentration of, for example, at least or more than 1.5, 2, 3, 4, 5, 6, 7, 8, 9, or 10 grams (g) per 100 mL of solvent-water mixture (i.e., amount of at least or more than 1.5, 2, 3, 4, 5, 6, 7, 8, 9, or 10 wt %), or amount within a range bounded by any two of the foregoing values.

As mentioned above, a proportionate amount of the THOS compound is added to the suspension to coat each sacrificial core particle with a coating of silica. For purposes of the invention, a minimum amount of the THOS is added to fully coat each sacrificial core particle with a complete coating (shell) of silica, typically having a minimum thickness of at least 1 nm and maximum thickness of 25, 50, or 100 nm (or possibly up to 150 or 200 nm in some embodiments), or any of the thicknesses provided earlier above. In some embodiments, the amount of the THOS is below an amount capable of producing a silica shell thickness greater than 100 nm, 150 nm, or 200 nm. The amount of THOS added at one time (i.e., for producing a single batch of HSPs) should also be below an amount capable of producing free silica particles. As a general guide, it has herein been found that, for a suspension of sacrificial core particles of 5 g per 100 mL of solvent-water mixture, a TEOS amount of 25 mL (i.e., about 23 g, considering density of 0.933 g/mL) generally results in a silica shell thickness of 100 nm or greater. Addition of more than 25 mL of TEOS to a suspension of sacrificial core particles of 5 g per 100 mL of solvent-water mixture for a single batch of HSPs can result in overly thick silica shells, aggregation, or production of free silica particles. Thus, in preferred embodiments, a TEOS amount of no more than or less than 20 g, 15 g, 10 g, 5 g, 2, g, 1 g, 0.5 g, or 0.1 g, or TEOS amount within a range bounded by any two of the foregoing values, is used for producing a single batch of HSPs per 100 mL of solvent-water mixture and 5 g of sacrificial core particles. By calculation of the relative molar amount of the TEOS used in the above guiding example, the requisite molar, volume, and weight amount of other THOS compounds can be readily determined. Nevertheless, it is important to also consider the effect of the size of the sacrificial core particles on the resulting silica shell thickness. For example, typically, the 100 nm silica shell thickness limit is applicable for sacrificial core particles having a size of up to or less than 100, 200, 300, 400, or 500 nm; if a significantly larger sacrificial particle core size of, for example, 1, 2, 5, or 10 microns is used, the amount of THOS will need to be adjusted accordingly, with resulting silica shell thickness typically being above 100 nm, e.g., 200, 300, 400, or 500 nm thickness.

In one embodiment, all of the THOS needed to coat the sacrificial core particles at a desired silica shell thickness, i.e., for a batch of core-shell particles, is added to the reaction mixture in one (single) step. In another embodiment, particularly where the formation of free silica particles is to be further avoided, all of the THOS needed to coat the sacrificial core particles at a desired silica shell thickness, i.e., for a batch of core-shell particles, is added to the reaction mixture in aliquots (parts). The number of aliquots may be, for example, two, three, four, or an additional number. Typically, the aliquots of THOS are separated by a time interval sufficient for at least 70, 80, 90, or 100% of the THOS to be consumed by the reaction before the next aliquot is added. The time interval between aliquots may be for example, 1, 2, 3, 4, 5, 6, 7, 8, 9, 10, 11, or 12 hours, or an amount of time within a range bounded by any two of the foregoing values.

In one embodiment of the method, the present disclosure is directed to a method for producing hollow silica particles (HSPs) in which the solvent-water mixture is recycled. A general schematic of the process is shown in FIG. 1. Notably, each instance of solvent recycling can be used to produce another batch of HSPs. As mentioned above, step (i) of the process involves producing core-shell particles in which each core-shell particle contains a sacrificial core coated with a silica shell, by adding one or more THOS compounds and a hydroxide base to a suspension of sacrificial core particles in a solvent-water mixture, wherein the resulting suspension has a pH of at least 10 after the THOS and hydroxide base are present in the suspension. In the solvent recycling version of the process, the foregoing step (i) can be considered to produce a first batch of core-shell particles. Then, in a subsequent step, i.e., step (ii), the first batch of core-shell particles is separated from the solvent-water mixture to result in a dry first batch of core-shell particles and first-stage recovered solvent-water mixture corresponding to the separated solvent-water mixture. The first batch of core-shell particles can be separated from the solvent-water mixture by any suitable means known in the art, including centrifugation, filtration, or decantation.

In step (iii) of the solvent recycling version of the process, a second batch of core-shell particles is produced in the first-stage recovered solvent-water mixture separated out in step (ii). Step (iii) employs overall similar conditions as employed in step (i). More specifically, step (iii) proceeds by adding sacrificial core particles, THOS, and hydroxide base sufficient to adjust the pH of the first-stage recovered solvent-water mixture to at least 10, 10.5, 11, 11.5, or 12, wherein step (iii) results in a coating of silica on the sacrificial core particles to produce the second batch of core-shell particles.

Step (iv) of the solvent recycling version of the process proceeds analogously as step (ii). In step (iv), the second batch of core-shell particles is separated from the first-stage recovered solvent-water mixture in step (iii) to result in a dry second batch of core-shell particles and second-stage recovered solvent-water mixture. The recycling process can continue any number of times by adding steps equivalent to steps (iii) and (iv), as above, to produce more core-shell particles using recycled solvent-water mixture. For example, after step (iv), the method can further include: step (iii-a), producing a third batch of core-shell particles in the second-stage recovered solvent-water mixture by adding sacrificial core particles, THOS, and hydroxide base sufficient to adjust the pH of the second-stage recovered solvent-water mixture to at least 10, 10.5, 11, 11.5, or 12, wherein step (iii-a) results in a coating of silica on the sacrificial core particles to produce the third batch of core-shell particles; and step (iv-a) involves separating the third batch of core-shell particles from the second-stage recovered solvent-water mixture used in step (iii-a) to result in a dry third batch of core-shell particles and third-stage recovered solvent-water mixture.

In step (v) of the solvent recycling version of the process, the total batches of dried core-shell particles produced are subjected to a core removal process to result in removal of the sacrificial cores and resultant production of the hollow silica particles (i.e., conversion of the core-shell particles to HSPs). The core removal process can employ any of the processes well known in the art for decomposing (typically, vaporizing) or dissolving organic matter. In some embodiments, the core removal process is a thermal decomposition (thermolysis) process, wherein the decomposition process employs sufficient thermal energy to result in decomposition and vaporization of the sacrificial cores, to produce hollow silica particles. The thermolysis step can be achieved by subjecting the core-shell particles to any of those processes well known in the art capable of decomposing and vaporizing organic matter while not capable of decomposing the silica shells. The thermal decomposition method may be by direct application of heat (e.g., placing the core-shell particles in a furnace) or by exposure to thermally degradative radiation (e.g., IR). In other embodiments, the core removal process is a chemical removal process, such as by contacting the core-shell particles with an organic solvent capable of dissolving the organic cores. The yield of hollow silica particles resulting from the above recycling version of the process may be, for example, at least or more than 10, 20, 30, 40, 50, 60, 70, 80, 90, or 100 cm$^3$ per 100 mL of solvent-water mixture after completion of all recycling steps and step (v).

The present disclosure is also directed to a method for producing hollow silica particles in which the yield of hollow silica particles is substantially increased, e.g., at least or more than 10, 20, 30, 40, 50, 60, 70, 80, 90, or 100 cm$^3$ per 100 mL of solvent-water mixture, even without recycling of the solvent-water mixture, i.e., in the presence or absence of recycling of the solvent-water mixture. The foregoing variation of the method is herein also referred to as the "high yield method". In the high yield method, step (i) is conducted as described above, except that it employs an amount (concentration) of sacrificial core particles higher than conventionally used in the art, e.g., at least or more than 2, 3, 4, or 5 wt % while maintaining a pH of at least 10, 10.5, 11, 11.5, or 12 after the THOS and hydroxide base are added to the suspension of sacrificial core particles. In one embodiment, all of the THOS used for the entire reaction is added in one step to the suspension of sacrificial core particles. In another embodiment, the THOS used for the entire reaction is added in parts (i.e., in aliquots) to the suspension of sacrificial core particles separated by a suitable time period between additions (e.g., 4-10 hours). In either case, the pH of at least 10, 10.5, 11, 11.5, or 12 should be maintained. Following step (i) as set forth above, the method proceeds with step (ii) as described above, i.e., separating the batch of core-shell particles from the solvent-water mixture to result in a dry batch of core-shell particles and separated solvent-water mixture, and this followed by the core removal process described above.

In another aspect, the present disclosure is directed to a method of thermally insulating or sound proofing a surface. In the method, the above-described HSPs, produced as described above, are applied onto a surface in need of thermal insulation. The surface can belong to any object or material for which thermal insulation or sound proofing is desired. In a first embodiment, the material being coated with the thermally insulating composition is glass, wherein the glass may be part of a window or a pane or sheet of glass to be installed into or manufactured as a window or other functional object. In a second embodiment, the material being coated is a structural material, wherein the structural material is any material that may ordinarily be used to provide structure (e.g., wall, ceiling, tiles, or flooring material) to the interior space where people dwell, reside, or work. In a third embodiment, the material being coated is a paper or plastic product useful in holding a food or beverage (e.g., a cup, drinking glass, or food container). The paper or plastic product may be in the shape of the food or beverage article when coated, or the paper or plastic product may be in a raw or precursor (bulk) form when coated, and then subsequently shaped into the paper or plastic product. In a fourth embodiment, the material being coated is a fabric, particularly a fabric used in clothing. The fabric may be clothing or a textile article for which thermal insulation could be useful (e.g., a pot holder), or the fabric may be in precursor (bulk) form when coated, and then subsequently used to make the clothing or textile. In a fifth embodiment, the material being coated is a metal, such as for a metal pipe.

The thermally insulating composition can be coated onto a surface by any of the means well known in the art for applying a coating of a liquid onto a surface. The liquid composition may be, for example, brush coated (i.e., painted), spray coated, dip coated, or spin coated onto a surface. The foregoing methods are primarily suitable for coating with a liquid. For more viscous versions of the thermal insulating composition, the composition may still be applied by, for example, brush, dip, or spin coating. However, for tacky, gel-like, or rubbery versions of the thermal insulating composition, the composition may be applied by, for example, forming a film of the composition (e.g., by pouring a liquid form onto a surface or into a mold, leveling, and allowing to harden) and adhering the resulting film onto a surface. The film may be adhered by, for example, application of pressure and/or heat on the film while on the surface being coated, or by using an intermediate adhesive.

Examples have been set forth below for the purpose of illustration and to describe certain specific embodiments of the invention. However, the scope of this invention is not to be in any way limited by the examples set forth herein.

EXAMPLES

Production of Hollow Silica Particles

The following described process resulted in very high yields (ca. 25 times the reported methods) of hollow silica particles with minimal wastage of solvents, resulting in low cost. The cost of hollow silica particles was reduced in this work by two approaches: (1) by increasing the synthesis yield for the amount of solvent used, and (2) by recycling the solvents. The PS particles were synthesized by modifying previously reported methods (e.g., P. C. Thapliyal et al., *J. Materials*, Article ID 127049, 2014).

Figure 2A:
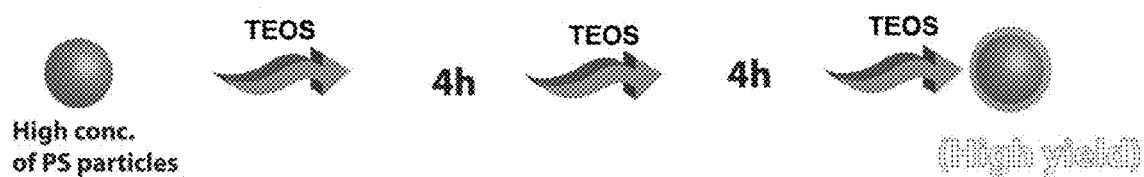
FIGS. 2A-2C.
Figure 2B:
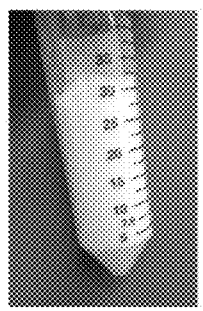
Figure 2C:
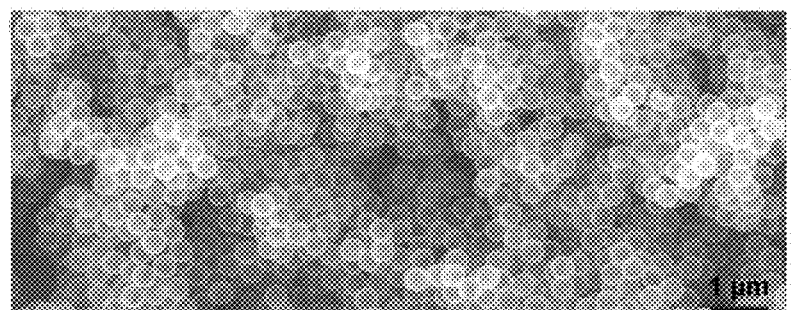

For hollow silica particle synthesis, in a typical experiment, 5.33 g of 300 nm PS particles was added into a solution having 100 mL of isopropanol, 25 mL water, and ammonium hydroxide (28-30%; to make a solution with pH≈11). Then the reaction mixture was stirred for about 10 minutes. In the second step, a total of 4.25 mL of tetraethyl orthosilicate (TEOS) was added in three aliquots of 1.42 mL each, separated by 4 hours, while stirring. The TEOS amount was calculated to form ca. 8-15 nm thick shells. Finally, the PS (core)—silica (shell) particles were centrifuged, and the residue containing the core-shell particles was burned at 550° C. Without being bound by theory, it is herein surmised that previous efforts to achieve high yields may have failed because very high concentrations of TEOS resulted in free silica particle formation as a side reaction. In an effort to mitigate this potential problem, TEOS was added in aliquots. FIG. 2A shows a schematic demonstration of the presently described approach of adding TEOS at specified time intervals to avoid reaching very high concentrations at any time in the reaction mixture, while adding sufficient amounts overall to form shells around all the PS particles (a large amount). FIG. 2B shows hollow particles obtained from 100 mL of isopropanol. FIG. 2C is a scanning electron microscope (SEM) image of the hollow silica particles obtained.

Figure 3A:
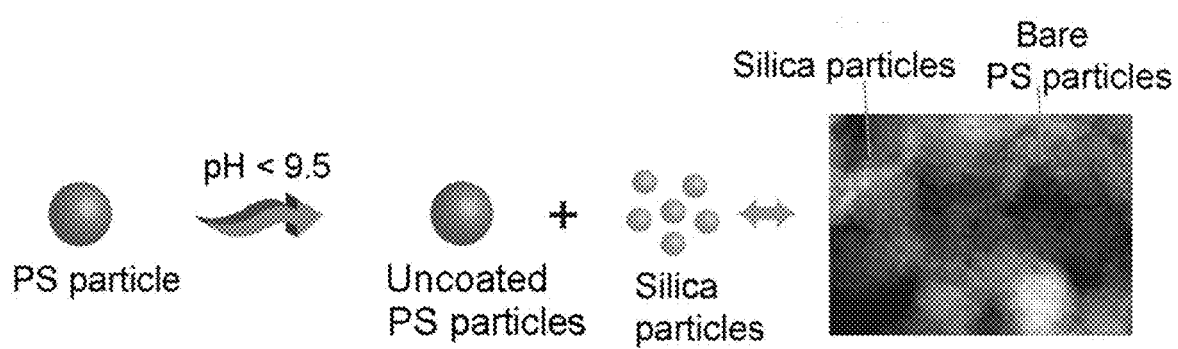
FIGS. 3A-3B.
Figure 3B:
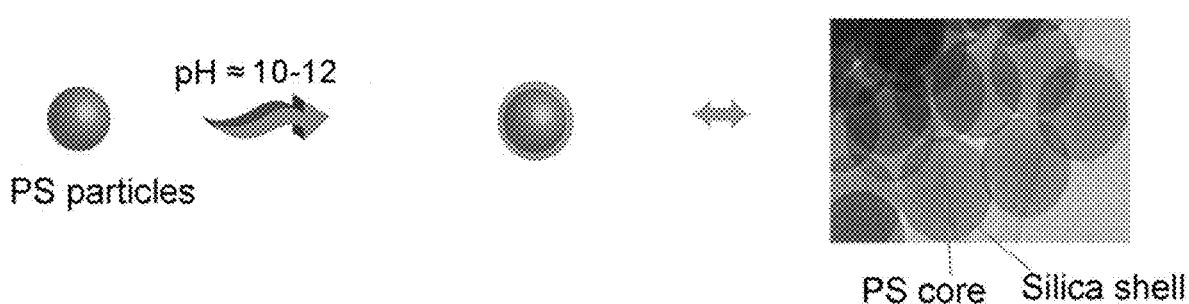

Efforts to further increase the reaction yield by increasing the amount of PS particles (>8.0 g particles/100 mL of isopropanol) resulted in only partial shell formation on the PS particles. A possible theory is that very high concentrations of PS particles increased the viscosity of the reaction mixture, thereby hindering the uniform diffusion of TEOS. Notably, hollow particle formation was not possible when the isopropanol to water ratio was below 1.25. The best particles were obtained at an isopropanol/water ratio of 2.3-5.0. High reaction yields were obtained when the reaction conditions, especially the reaction pH and TEOS amount, were fully optimized. It was herein observed that if an insufficient amount of TEOS was added, incomplete shells were formed. Similarly, if the reaction pH was lower than 9.5, small free silica nanoparticles (≈2-10 nm) were formed. Therefore, for adequate shell formation and high yields, the pH should be higher than 9.5 (optimal pH range: 10.5-11.5). FIG. 3A (left side) is a schematic depiction of shell formation when pH is below 9.5; FIG. (right side) is a TEM image showing bare PS particles and free silica particles formed in the process. FIG. 3B (left side) is a schematic depiction of shell formation when pH is about 11; FIG. 3B (right side) is a SEM image showing nicely formed PS core-silica shell particles without any free silica particle formation. Note: the schematics show only core-shell particle formation. The step of burning the PS cores to obtain hollow silica particles is not shown.

In view of the above results, TEOS was added at 4 hour time intervals, as this was the minimum time required for the reaction mixture to consume 80-90% of the TEOS. The TEOS aliquots can be added at intervals of more than 4 hours but less than 10 hours. The TEOS aliquots can also be added at intervals of less than 4 hours (e.g., at least, up to, or less than 0.5, 1, 2, or 3 hours), or in intervals within any range therein or between any of these values and up to 5, 6, 7, 8, 9, or 10 hours, e.g., 1-10 hours. It was herein observed that if the intervals were increased beyond 10 hours, the ammonium hydroxide concentration decreased and the consumption of TEOS after subsequent aliquot additions became very slow. Although TEOS was added in aliquots, it was observed that even when all of the TEOS was added in one step, similar hollow silica particles were obtained. Therefore, whether TEOS was added all at one time or in aliquots did not affect the final outcome. It was the reaction pH that controlled shell formation. Well-formed silica shells were obtained only in a pH range of 10.5-11.5.

To further lower the synthesis cost, recycling of the solvent-water mixture was also herein demonstrated. After the core-shell particles were collected by centrifugation, the supernatant was used again to synthesize the next batch of core-shell particles by bringing the pH back to 11. The pH dropped from 11 to about 9.0 by the end of the synthesis cycle; thus, the pH of the supernatant after a synthesis cycle was always lower than in the initial reaction mixture. The reduction in the pH resulted from (1) evaporation and (2) consumption of ammonia as the reaction proceeded. About 85% of the solution was retrieved at each step via centrifugation, although it was observed that up to ca. 95% of the solution could be retrieved. The centrifugation and supernatant use cycle was repeated three times. In each step, the amounts of PS particles and TEOS were varied to make the proportional amounts the same as in the original reaction mixture. SEM imaging showed that the quality of the particles synthesized remained the same in all iterations. Thus, the entire process described herein is highly useful for increasing the amount of hollow particles obtained without wasting solvent, which translates to a significantly lowered process cost.

Figure 4A:
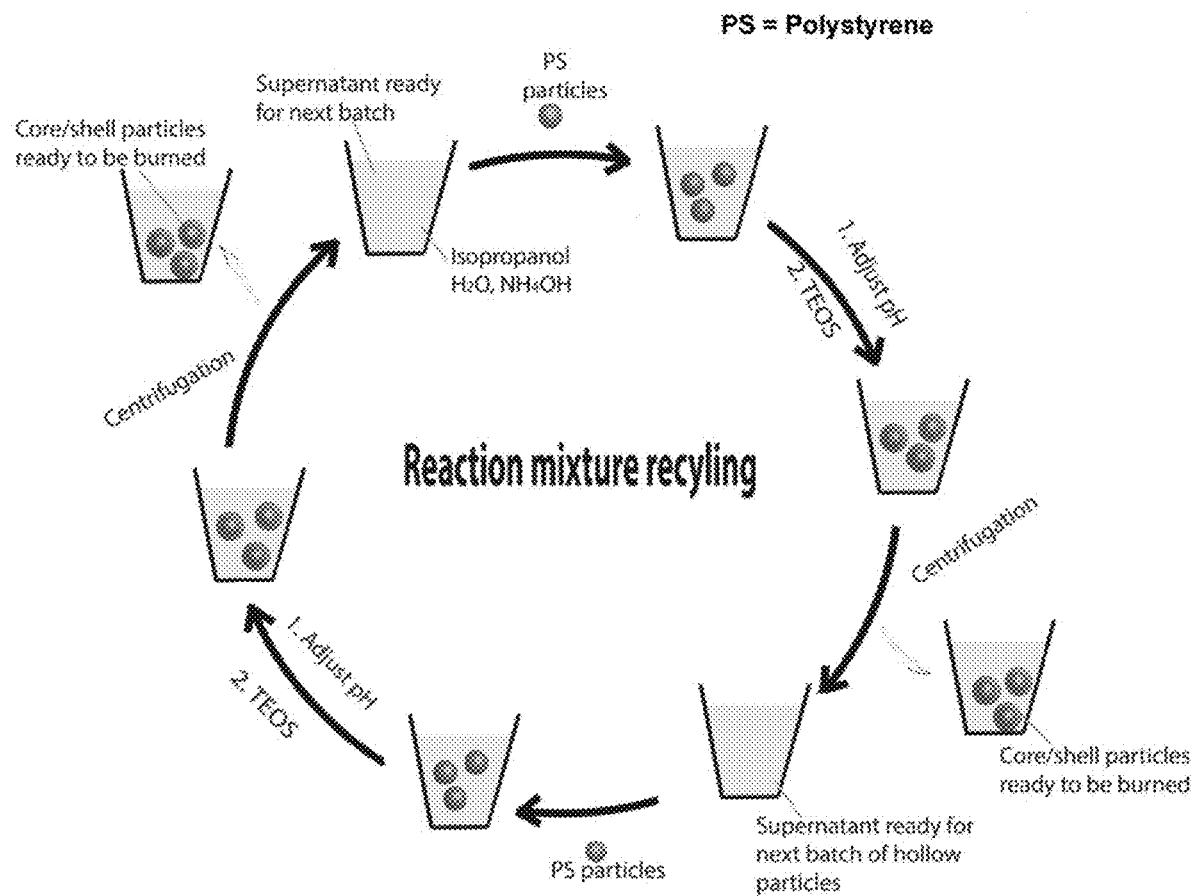
FIGS. 4A-4D.
Figures 4B, 4C, 4D:
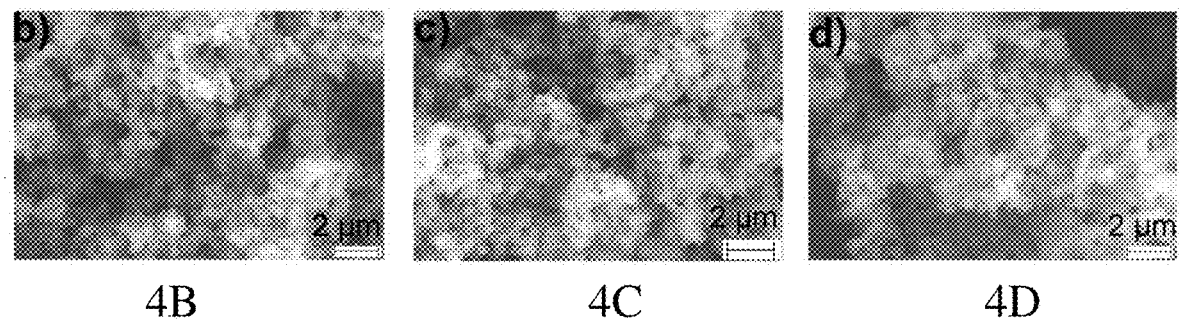

Using the same 100 mL solvent, approximately 70 cm³ of hollow silica particles was obtained, and the supernatant could still be used to synthesize the next batch of particles. Notably, previously reported methods provide less than 3 cm³ of hollow silica particles/100 mL of alcohol (e.g., T. Gao et al., *ACS Appl. Mater. Interfaces*, 5, 761-767, 2013). Therefore, the present approach provided ca. 23 times more hollow silica particles for the same amount of alcohol if the solvent is recycled three times (or 35 times (110 g) if the solvent is recycled five times). The process was repeated for only three iterations. However, it was herein calculated that assuming 85% solvent recovery after each iteration (a conservative estimate, since 95% of the solution was recovered) and extrapolating the number of iterations to five (after which the amount solvent drops to about 50 mL), about 110 g of particles can be obtained from the same reaction mixture (100 mL isopropanol+25 mL water) just by adjusting the pH and adding additional TEOS. FIG. 4A shows the schematic of reaction solution recycling, and FIGS. 4B, 4C, and 4D are SEM images of hollow particles obtained from the original synthesis cycle, the first reiteration, and the second reiteration, respectively.

In a similar approach, it was herein observed that the reaction mixture can be re-used indefinitely by adding additional fresh solvent (isopropanol+water) and adjusting the pH, while making the volume of the final reaction mixture equal to the original volume. Indeed, solution recycling can be repeated as long as the solution is free of any TEOS oligomers remaining from a previous batch. TEOS oligomers remaining in the retrieved solution can make the particles of the subsequent batch somewhat rough as a result of large nanograin formation. The shell formation process involves the initial formation of small silica nanograins (oligomers), which then attach to the PS surface to form the contiguous silica shell. To avoid the presence of any TEOS oligomers or small silica nanograins, the reaction was permitted to proceed for 12 hours after the addition of the last aliquot of TEOS. The longer reaction time ensured that all TEOS was consumed. Additionally, centrifugation was employed to ensure the removal of any remaining silica nanograins. High-resolution TEM/energy-dispersive x-ray spectroscopy imaging further confirmed the absence of any small nanograins in the retrieved supernatant solution used for subsequent hollow particle synthesis cycles.

CONCLUSION

The above experiments demonstrate a synthesis strategy that can provide very high yields of hollow silica particles compared with previously reported methods. The critical requirement involved in achieving a high synthesis yield is to control the reaction pH and the amount of silica precursor. The above experiments also demonstrate recycling of the reaction solution, which further lowered the synthesis cost of the hollow silica particles. This work can open opportunities for a number of applications requiring large amounts of inexpensive hollow silica particles. Additionally, the recycling of reaction solutions can be applied in other similar particle synthesis strategies.

While there have been shown and described what are at present considered the preferred embodiments of the invention, those skilled in the art may make various changes and modifications which remain within the scope of the invention defined by the appended claims.

What is claimed is:

1. A method for producing hollow silica particles, comprising:
(i) producing a first batch of core-shell particles in which each core-shell particle contains a sacrificial core coated with a silica shell, by adding at least three aliquots of a tetrahydrocarbyl orthosilicate separated by a time interval of 4-12 hours between aliquots to a suspension of sacrificial core particles in a solvent-water mixture containing a hydroxide base, wherein the solvent is an organic solvent miscible with water, wherein the resulting suspension has a pH of at least 10 after the tetrahydrocarbyl orthosilicate and hydroxide base are present in the suspension, wherein the sacrificial core particles have an organic-based composition, and wherein the foregoing steps result in a coating of silica on the sacrificial core particles to produce the first batch of core-shell particles in the substantial absence of free silica particles;

(ii) separating the first batch of core-shell particles from the solvent-water mixture to result in a dry first batch of core-shell particles and first-stage recovered solvent-water mixture corresponding to the separated solvent-water mixture;

(iii) producing a second batch of core-shell particles in said first-stage recovered solvent-water mixture by adding sacrificial core particles, tetrahydrocarbyl orthosilicate, and hydroxide base sufficient to adjust the pH of the first-stage recovered solvent-water mixture to at least 10, wherein step (iii) results in a coating of silica on the sacrificial core particles to produce the second batch of core-shell particles;

(iv) separating the second batch of core-shell particles from the first-stage recovered solvent-water mixture used in step (iii) to result in a dry second batch of core-shell particles and second-stage recovered solvent-water mixture; and (v) subjecting said dry first and second batches of core-shell particles to a core removal process to result in removal of the sacrificial cores, to produce the hollow silica particles.

2. The method of claim 1, wherein the method further comprises, directly following step (iv):

(iii-a) producing a third batch of core-shell particles in said second-stage recovered solvent-water mixture by adding sacrificial core particles, tetrahydrocarbyl orthosilicate, and hydroxide base sufficient to adjust the pH of the second-stage recovered solvent-water mixture to at least 10, wherein step (iii-a) results in a coating of silica on the sacrificial core particles to produce the third batch of core-shell particles;

(iv-a) separating the third batch of core-shell particles from the second-stage recovered solvent-water mixture used in step (iii-a) to result in a dry third batch of core-shell particles and third-stage recovered solvent-water mixture; and wherein step (v) comprises subjecting said dry first, second, and third batches of core-shell particles to a core removal process to result in removal of the sacrificial cores, to produce the hollow silica particles.

3. The method according to claim 1, wherein said pH of at least 10 is a pH of at least 10.5.

4. The method according to claim 1, wherein step (v) results in at least 30 cm$^3$ of hollow silica particles per 100 mL of said solvent-water mixture.

5. The method of claim 1, wherein said hollow silica particles have a size of 10 nm to 10 microns.

6. The method according to claim 1, wherein said sacrificial core particles and resulting sacrificial cores in the core-shell particles have an organic polymer composition.

7. The method of claim 6, wherein said organic polymer composition is polystyrene.

8. The method according to claim 1, wherein said sacrificial core particles are present in said solvent-water mixture in a concentration of at least 2 wt %.

9. The method according to claim 1, wherein said solvent-water mixture contains at least or above 50% solvent.

10. The method according to claim 1, wherein the solvent-water mixture is an alcohol-water mixture.

11. A method for producing hollow silica particles, comprising:

(i) producing a batch of core-shell particles in which each core-shell particle contains a sacrificial core coated with a silica shell, by adding at least three aliquots of a tetrahydrocarbyl orthosilicate separated by a time interval of 4-12 hours between aliquots to a suspension of sacrificial core particles in a solvent-water mixture containing a hydroxide base, wherein the solvent is an organic solvent miscible with water, wherein said sacrificial core particles are present in said solvent-water mixture in a concentration of at least 2 wt %; wherein the resulting suspension has a pH of at least 10 after the tetrahydrocarbyl orthosilicate and hydroxide base are present in the suspension; wherein the sacrificial core particles have an organic-based composition; and wherein the foregoing steps result in a coating of silica on the sacrificial core particles to produce the batch of core-shell particles in the substantial absence of free silica particles;

(ii) separating the batch of core-shell particles from the solvent-water mixture to result in a dry batch of core-shell particles and separated solvent-water mixture; and (iii) subjecting said dry batch of core-shell particles to a core removal process to result in removal of the sacrificial cores, to produce at least 10 cm$^3$ of the hollow silica particles.

12. The method of claim 11, wherein said pH of at least 10 is a pH of at least 10.5.

13. The method according to claim 11, wherein said concentration of sacrificial core particles of at least 2 wt % is a concentration of sacrificial core particles of at least 4 wt %.

14. The method according to claim 11, wherein said at least 10 cm$^3$ of the hollow silica particles is at least 20 cm$^3$ of the hollow silica particles.

15. The method according to claim 11, wherein said hollow silica particles have a size of 10 nm to 10 microns.

16. The method according to claim 11, wherein said sacrificial core particles and resulting sacrificial cores have an organic polymer composition.

17. The method according to claim 11, wherein the solvent-water mixture is an alcohol-water mixture.

* * * * *